(12) United States Patent
Williamson et al.

(10) Patent No.: US 10,102,143 B2
(45) Date of Patent: Oct. 16, 2018

(54) EVICTION CONTROL FOR AN ADDRESS TRANSLATION CACHE

(71) Applicant: ARM LIMITED, Cambridge (GB)

(72) Inventors: Barry Duane Williamson, Austin, TX (US); Michael Filippo, Austin, TX (US); . Abhishek Raja, Austin, TX (US); Adrian Montero, Austin, TX (US); Miles Robert Dooley, Austin, TX (US)

(73) Assignee: ARM Limited, Cambridge (GB)

( * ) Notice: Subject to any disclaimer, the term of this patent is extended or adjusted under 35 U.S.C. 154(b) by 0 days.

(21) Appl. No.: 15/294,031

(22) Filed: Oct. 14, 2016

(65) Prior Publication Data

US 2018/0107606 A1 Apr. 19, 2018

(51) Int. Cl.
*G06F 12/08* (2016.01)
*G06F 12/1045* (2016.01)
*G06F 12/128* (2016.01)
*G06F 12/1009* (2016.01)

(52) U.S. Cl.
CPC ...... *G06F 12/1063* (2013.01); *G06F 12/1009* (2013.01); *G06F 12/128* (2013.01); *G06F 2212/621* (2013.01); *G06F 2212/68* (2013.01); *G06F 2212/69* (2013.01)

(58) Field of Classification Search
CPC ............ G06F 12/1027; G06F 12/1063; G06F 12/0811; G06F 12/0891; G06F 2212/681; G06F 2212/651; G06F 2212/652; G06F 2212/684; G06F 12/128; G06F 12/1009; G06F 2212/621; G06F 2212/68; G06F 2212/69
See application file for complete search history.

(56) References Cited

U.S. PATENT DOCUMENTS

| | | | | |
|---|---|---|---|---|
| 2006/0206686 | A1* | 9/2006 | Banerjee | G06F 12/1027 711/205 |
| 2013/0238874 | A1* | 9/2013 | Avudaiyappan | G06F 12/1027 711/207 |
| 2014/0136773 | A1* | 5/2014 | Michalak | G06F 3/0655 711/105 |

(Continued)

OTHER PUBLICATIONS

Jaleel et al., "High Performance Cache Replacement Using Re-Reference Interval Prediction (RRIP)" ISCA'10, Jun. 19-23, 2010, 12 pages.

(Continued)

*Primary Examiner* — Hiep Nguyen
(74) *Attorney, Agent, or Firm* — Nixon & Vanderhye P.C.

(57) ABSTRACT

A data processing system 2 includes an address translation cache 12 to store a plurality of address translation entries. Eviction control circuitry 10 selects a victim entry for eviction from address translation cache 12 using an eviction control parameter. The address translation cache 12 can store multiple different types of entry corresponding to respective different levels of address translation within a multiple-level page table walk. The different types of entry have different eviction control parameters assigned at the time of allocation. Eviction from the address translation cache is dependent upon the entry type, as well as the subsequent accesses to the entry concerned and the other entries within the address translation cache.

18 Claims, 9 Drawing Sheets

(56) References Cited

U.S. PATENT DOCUMENTS

Figure 1:
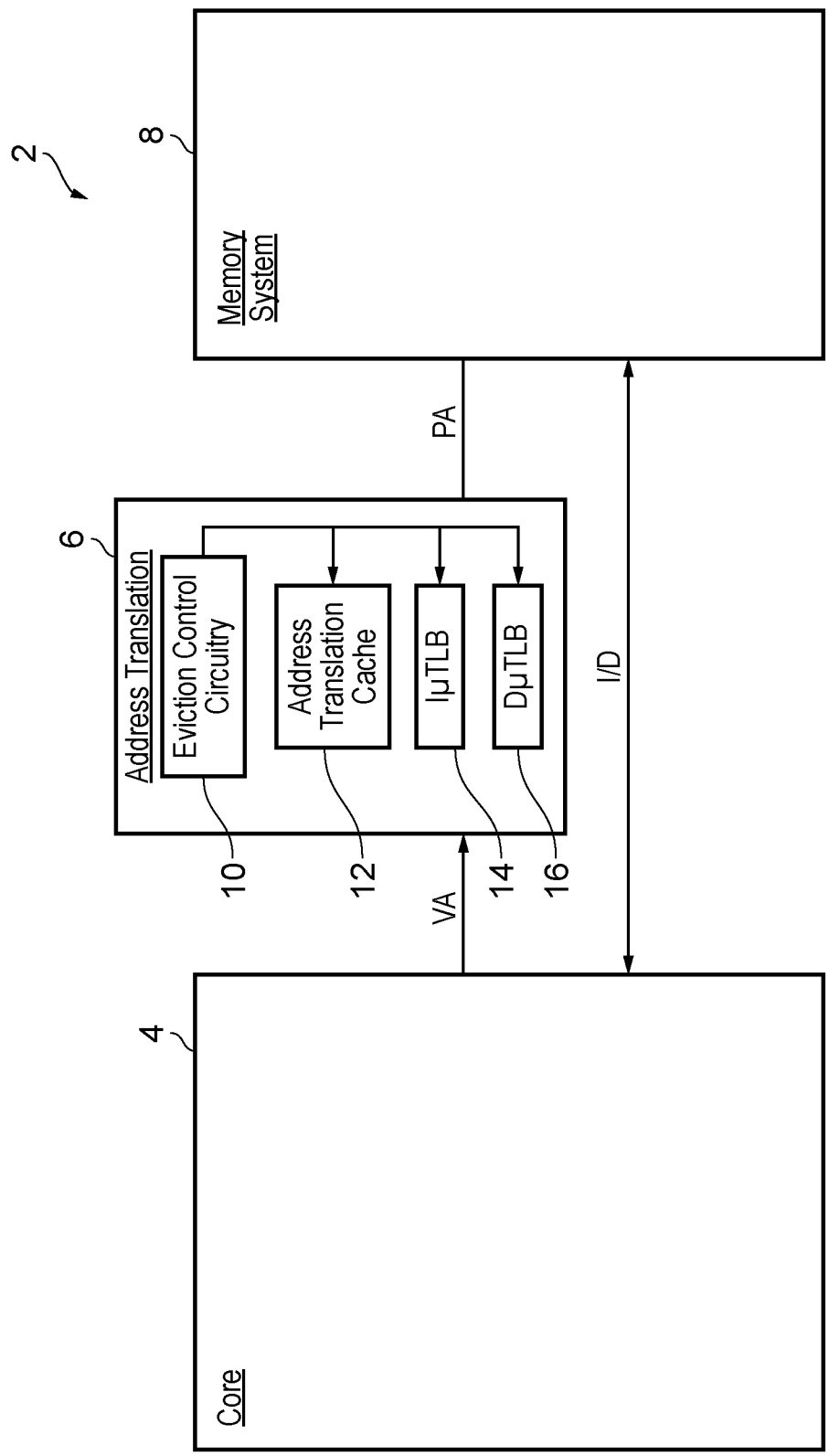

2015/0095610 A1* 4/2015 Ben-Meir ........... G06F 12/1027
                                                          711/207
2016/0231933 A1* 8/2016 Loh ...................... G06F 3/0604

OTHER PUBLICATIONS

Barr et al., "Translation Caching: Skip, Don't Walk (the Page Table)", *ISCA '10*, Jun. 19-23, 2010, 12 pages.

* cited by examiner

EVICTION CONTROL FOR AN ADDRESS TRANSLATION CACHE

BACKGROUND

Field

This disclosure relates to the field of data processing systems. More particularly, this disclosure relates to the control of eviction of address translation entries from within an address translation cache.

Description

It is known to provide data processing systems which incorporate an address translation cache, such as a translation lookaside buffer, to store address translation entries (TAG, translation, control data, etc) relating to the translation of, for example, virtual addresses to physical addresses. The address translation caches may also store further information regarding the memory accesses being made, such as permission data and memory attributes. Whilst the provision of an address translation cache is useful in improving performance by reducing the number of slow page table walks required, the address translation cache itself consumes circuit resources. Accordingly, it is desirable that efficient use be made of the capacity of the address translation cache.

SUMMARY

At least some embodiments of the present disclosure provide an address translation cache to store a plurality of address translation entries; and eviction control circuitry to select a victim entry for eviction from said address translation cache from among said plurality of address translation entries; wherein said plurality of address translation entries are selected from among a plurality of different entry types of address translation entries representing translation data specified at respective different levels of address translation within a multiple-level page table walk;

selection of said victim entry by said eviction control circuitry is dependent upon respective eviction control parameters associated with said plurality of address translation entries; and a given eviction control parameter for a given address translation entry is dependent upon an entry type of said given address translation entry among said plurality of different entry types of address translation entry.

At least some embodiments of the present disclosure provide address translation cache means for storing a plurality of address translation entries; and eviction control means for selecting a victim entry for eviction from said address translation cache from among said plurality of address translation entries; wherein said plurality of address translation entries are selected from among a plurality of different entry types of address translation entries representing translation data specified at respective different levels of address translation within a multiple-level page table walk;

selection of said victim entry by said eviction control means is dependent upon respective eviction control parameters associated with said plurality of address translation entries; and a given eviction control parameter for a given address translation entry is dependent upon an entry type of said given address translation entry among said plurality of different entry types of address translation entry.

At least some embodiments of the present disclosure provide storing a plurality of address translation entries within an address translation cache; and selecting a victim entry for eviction from said address translation cache from among said plurality of address translation entries; wherein said plurality of address translation entries are selected from among a plurality of different entry types of address translation entries representing translation data specified at respective different levels of address translation within a multiple-level page table walk;

selection of said victim entry is dependent upon respective eviction control parameters associated with said plurality of address translation entries; and a given eviction control parameter for a given address translation entry is dependent upon an entry type of said given address translation entry among said plurality of different entry types of address translation entry.

The above and other objects, features and advantages of this disclosure will be apparent from the following detailed description of illustrative embodiments which is to be read in connection with the accompanying drawings.

Figure 2:
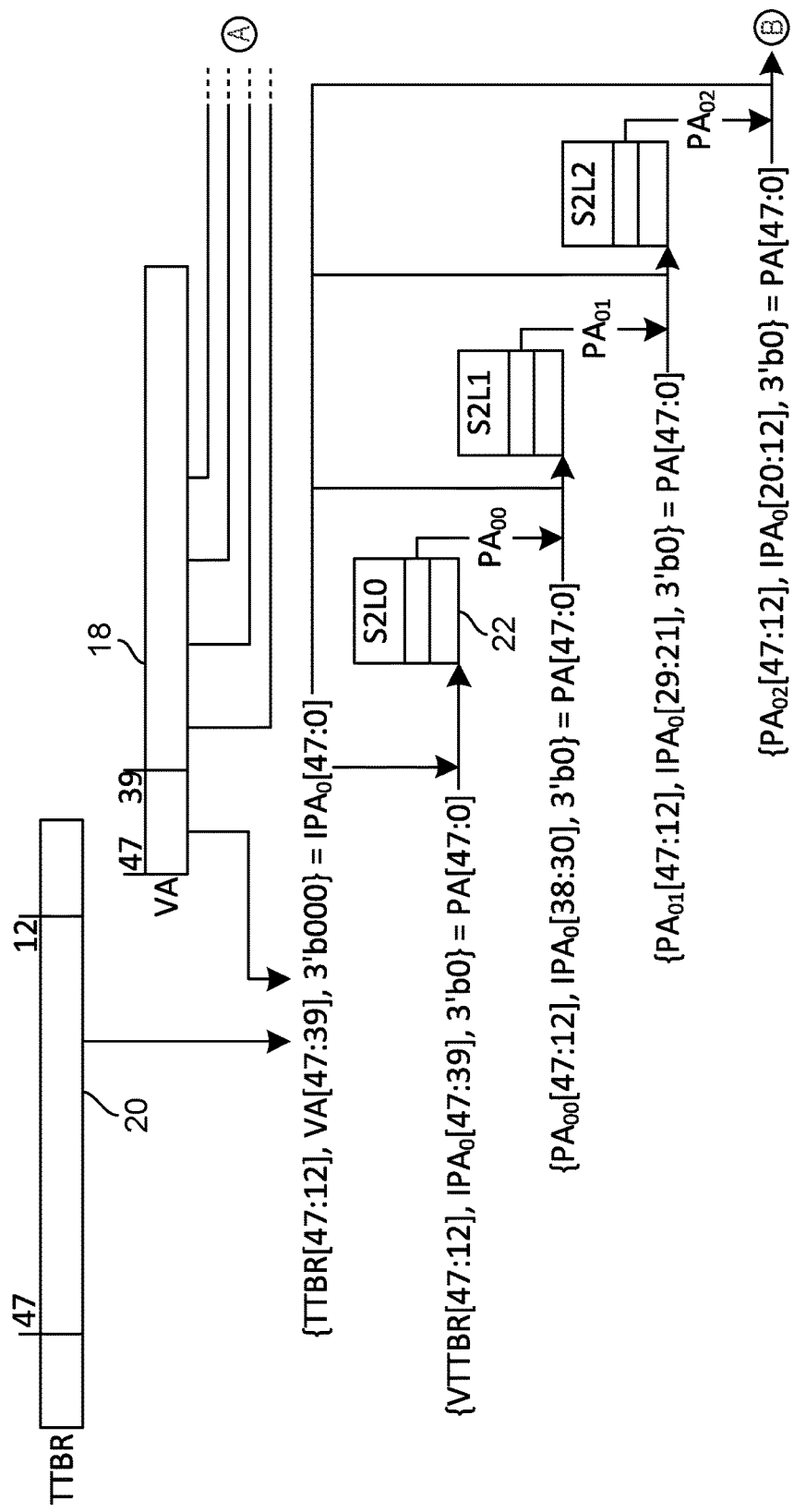
Figure 2:
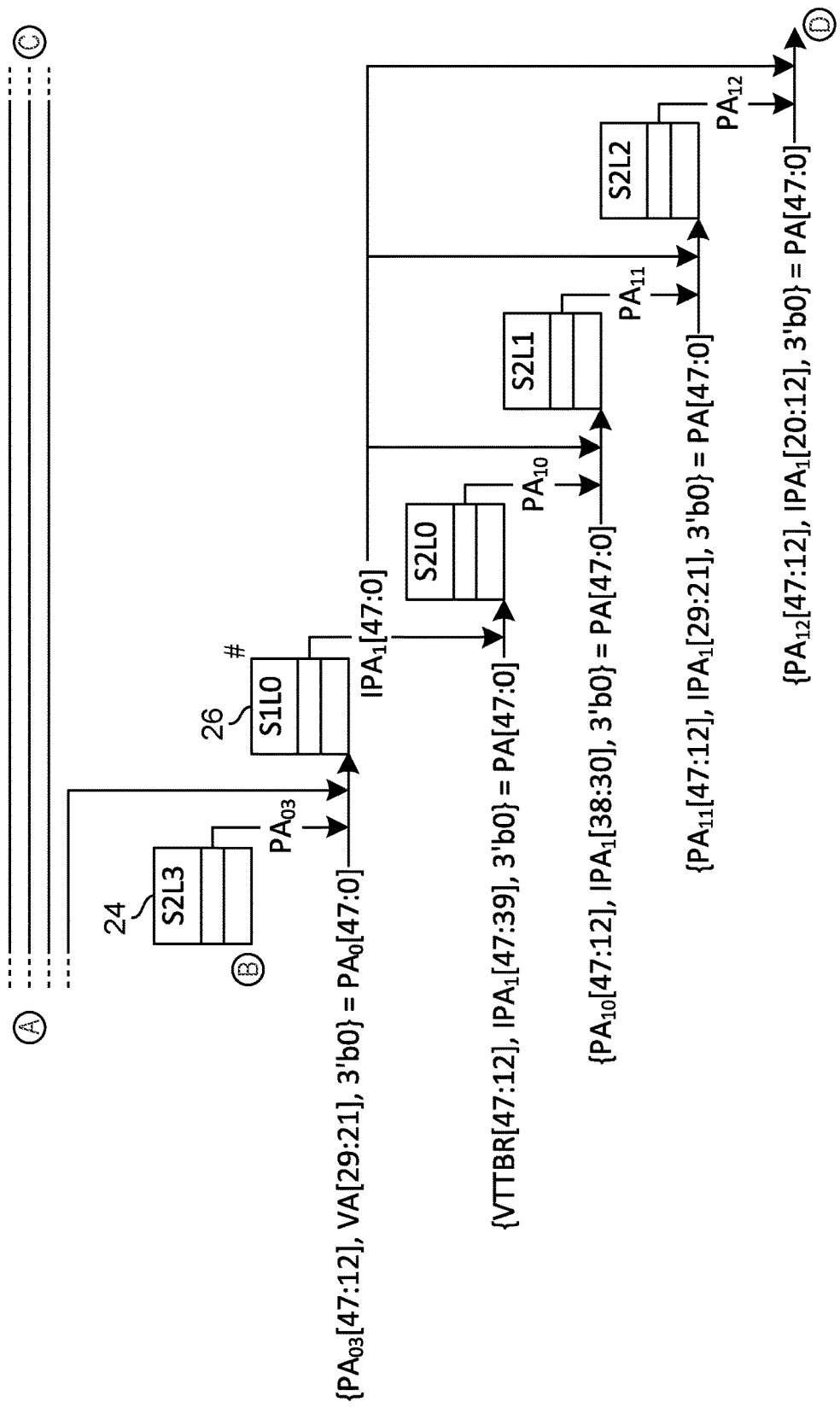
Figure 2:
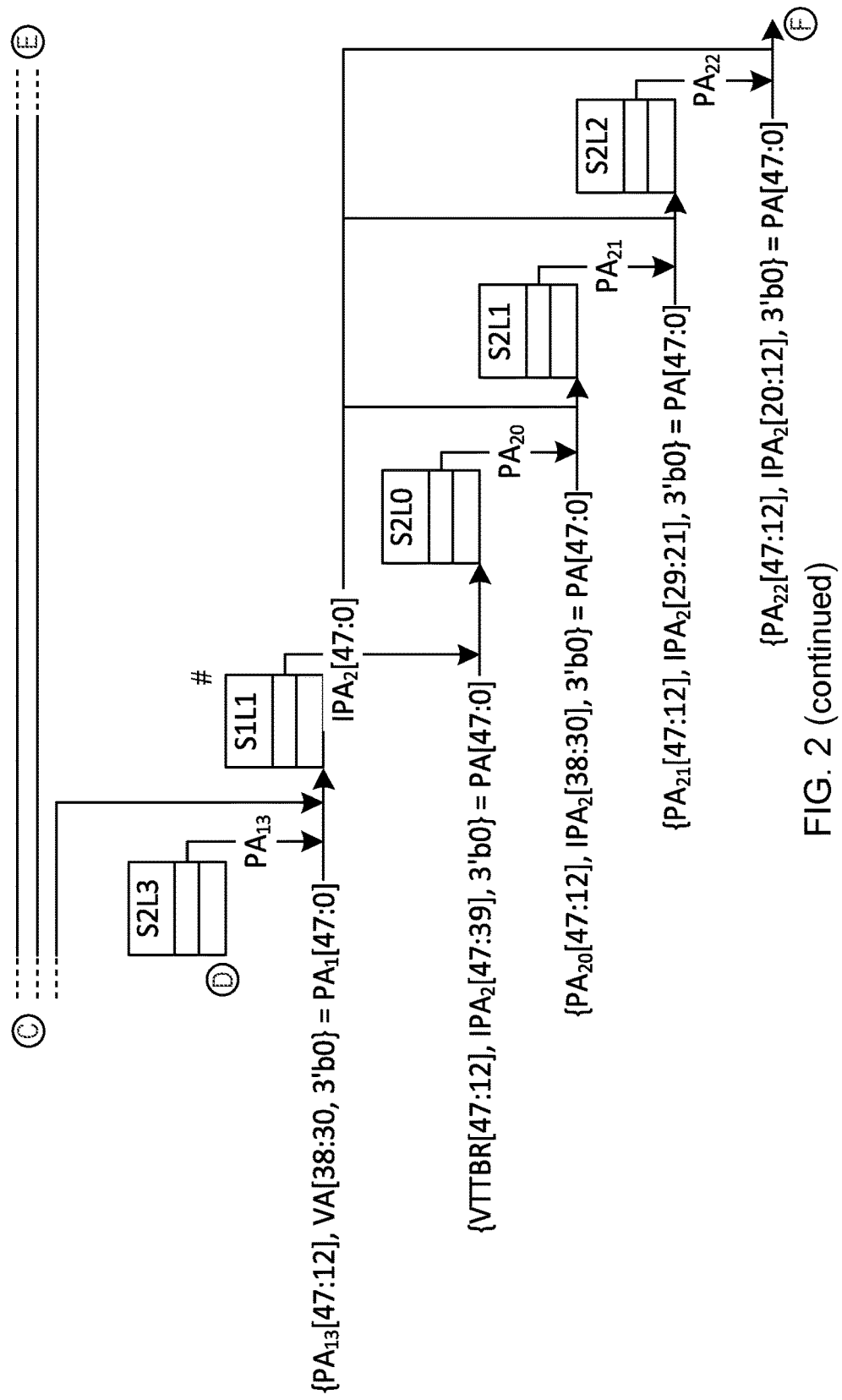
Figure 2:
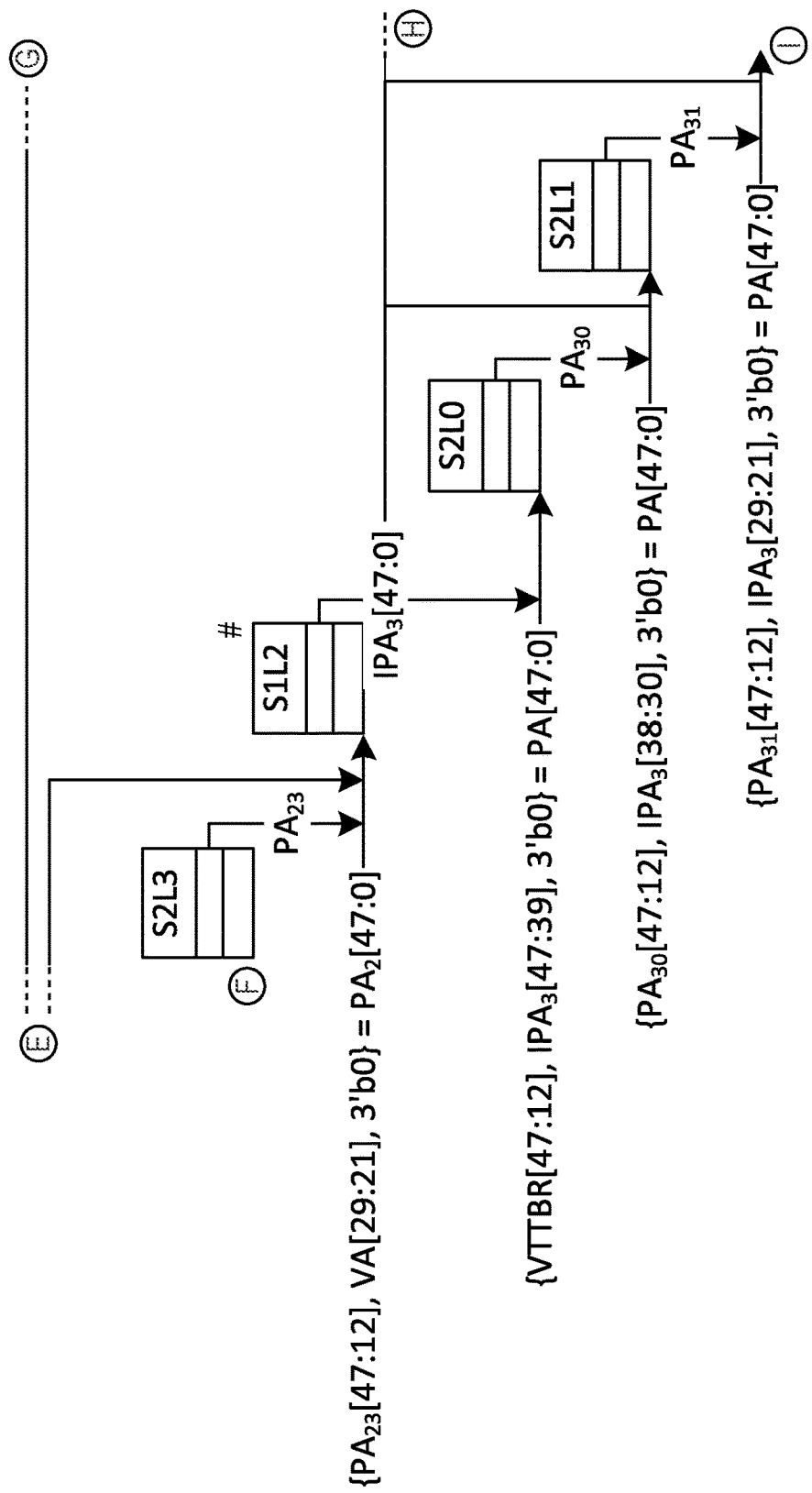
Figure 2:
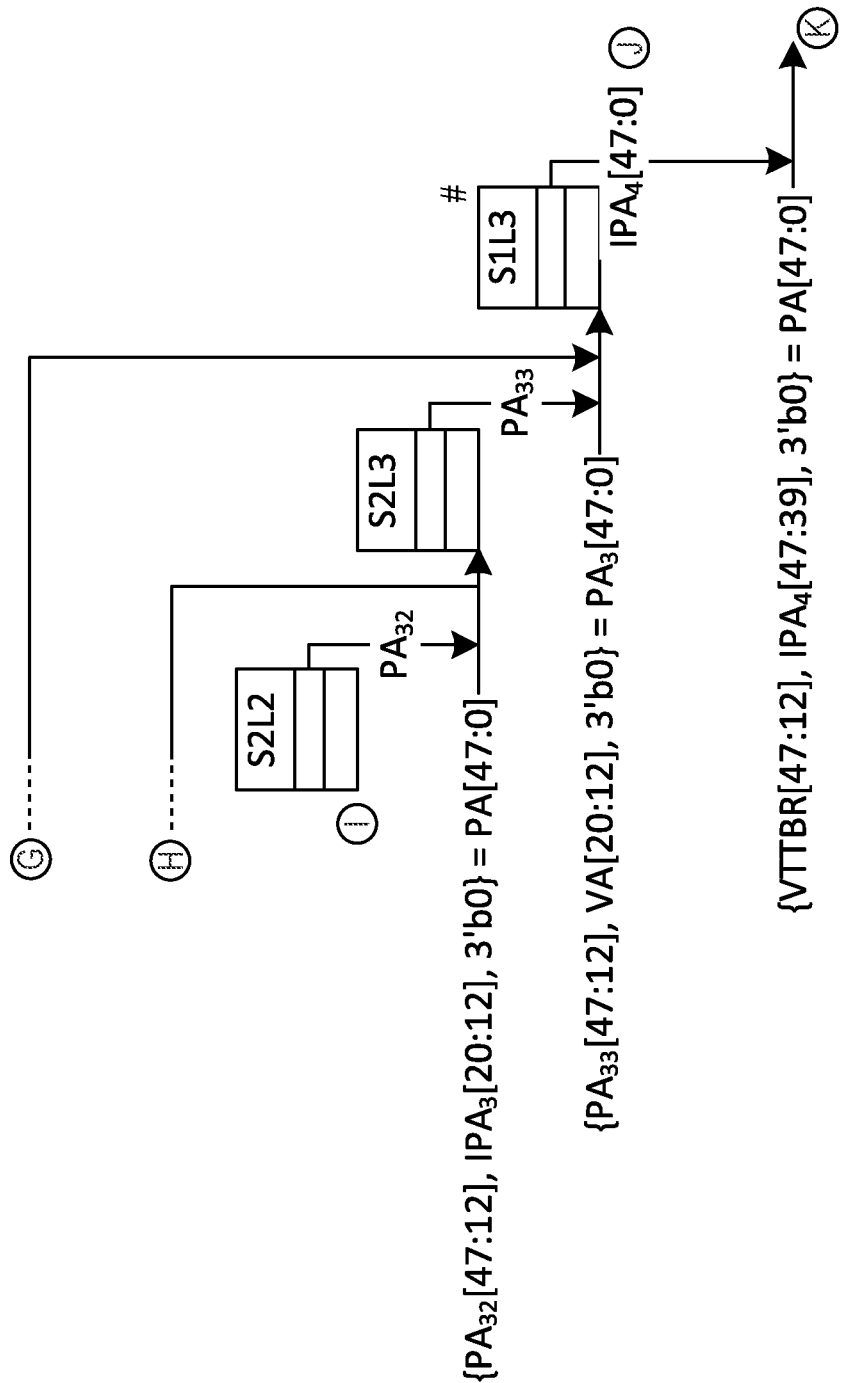
Figure 2:
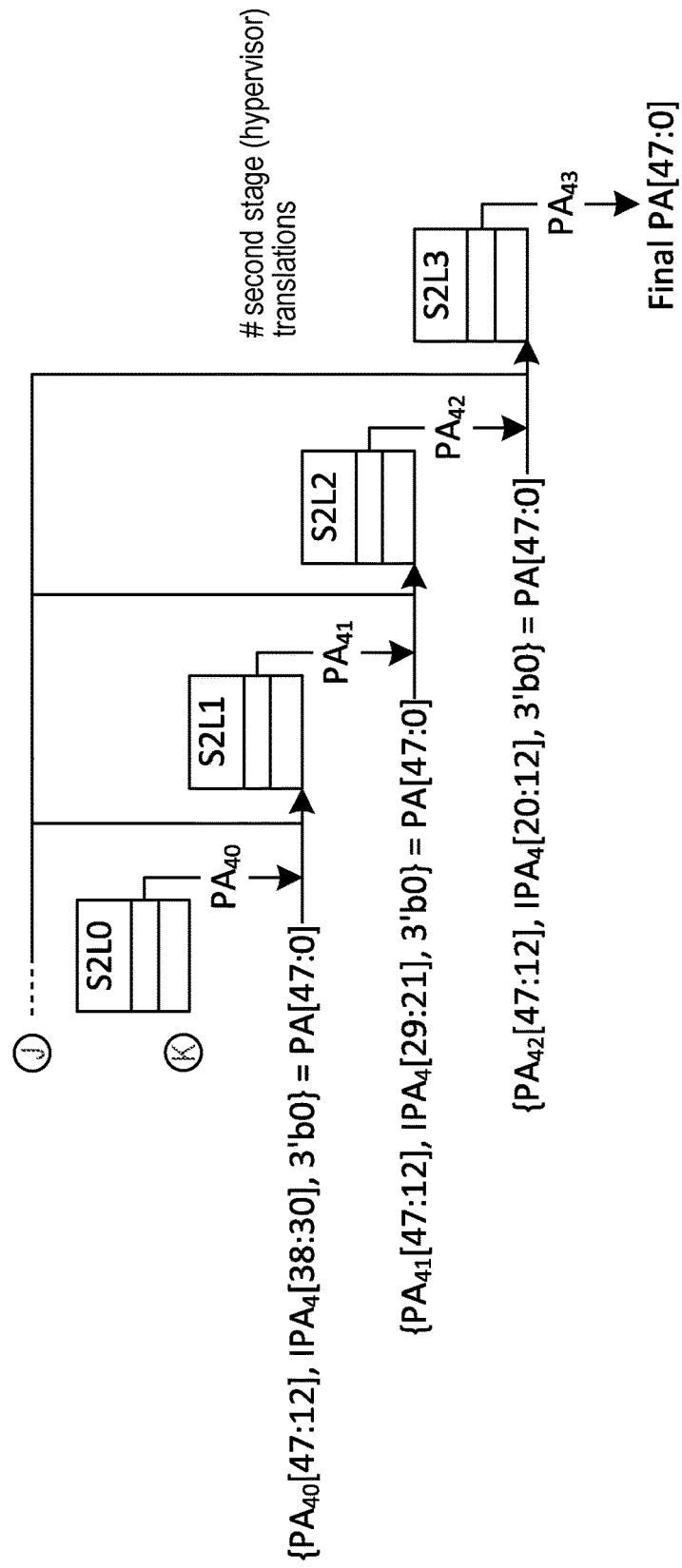
Figure 3:
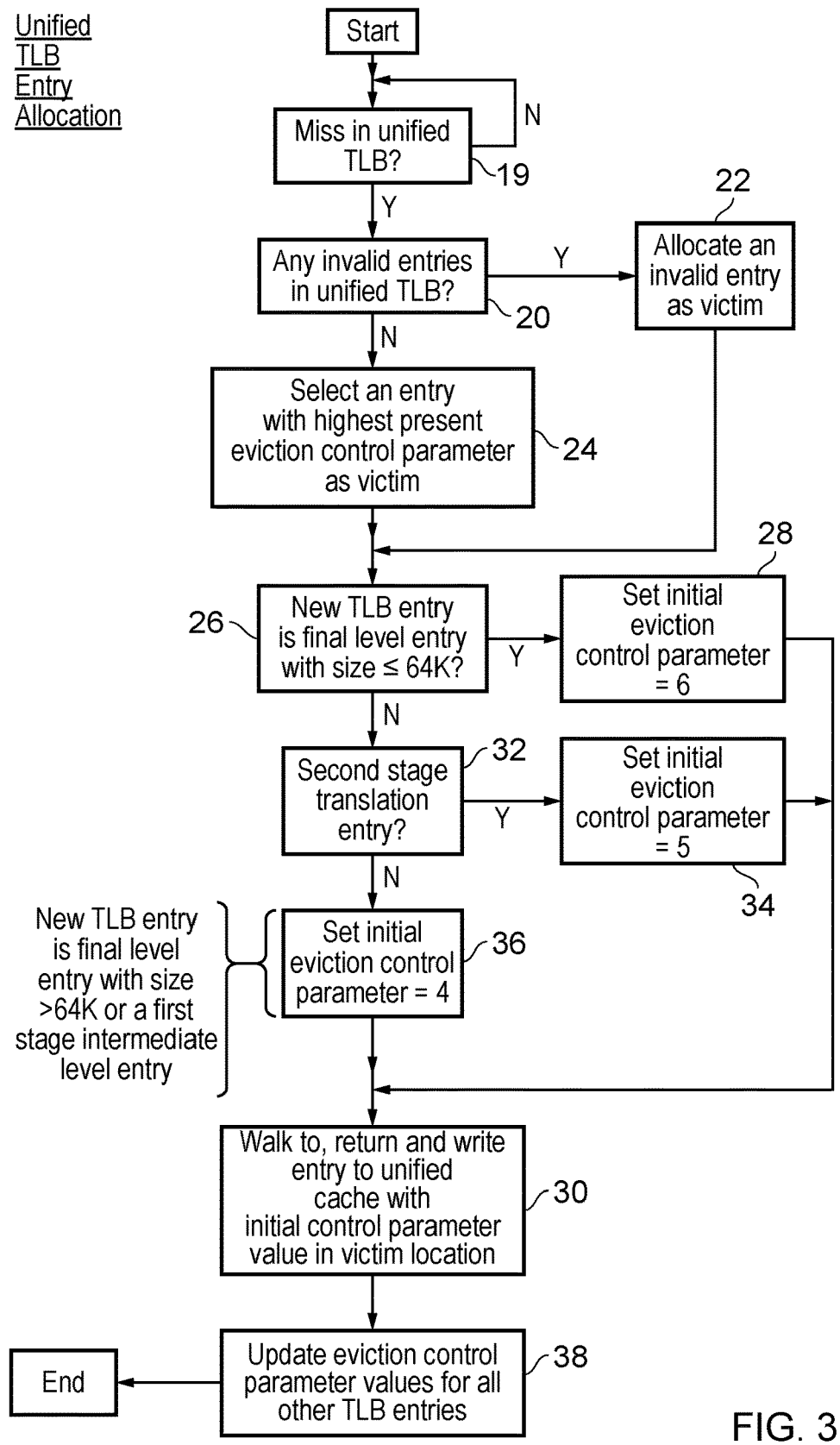
Figure 4:
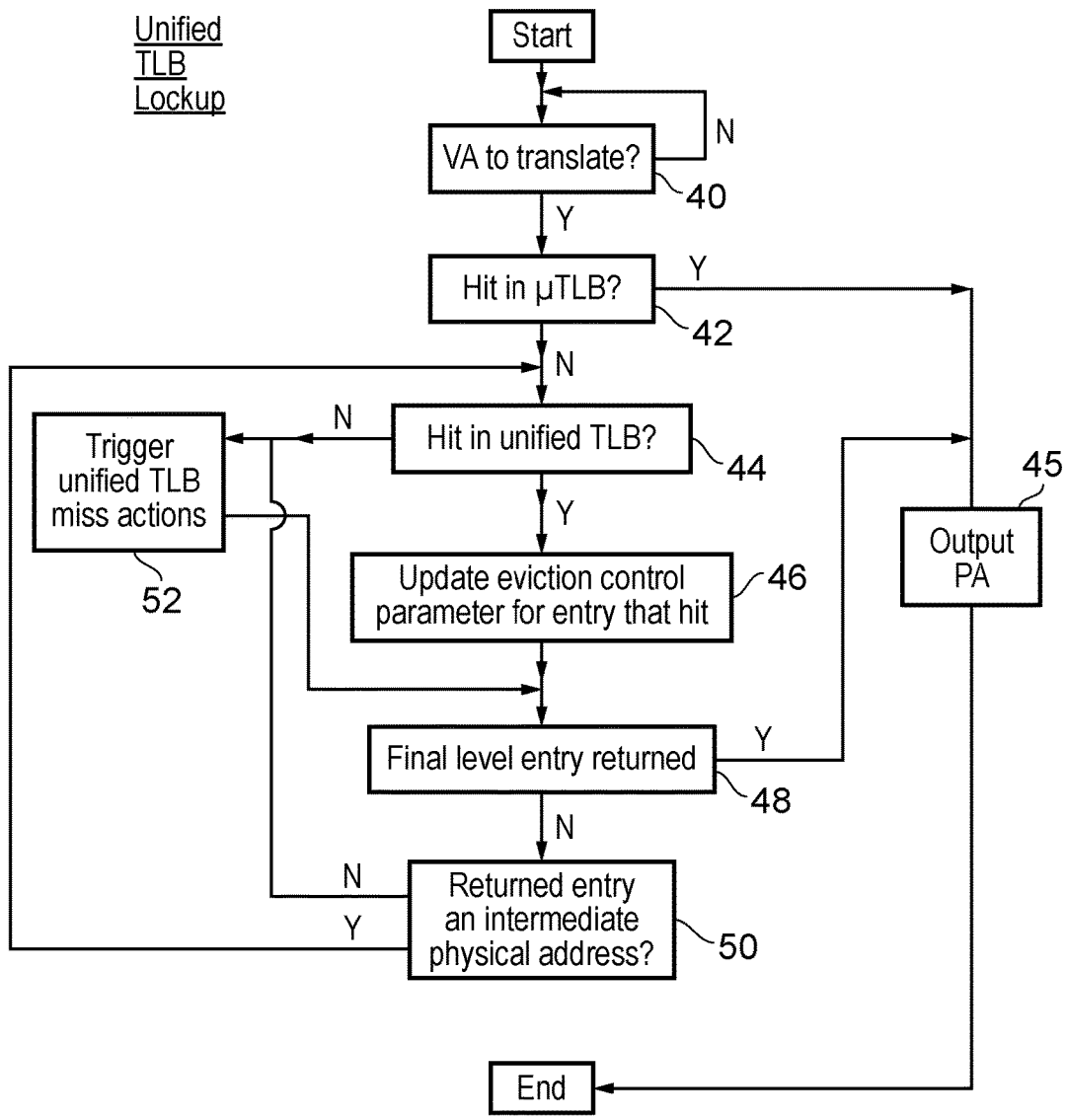

FIG. 1 illustrates a data processing system incorporating an address translation cache and eviction control circuitry for controlling eviction of address translation entries from the address translation cache;

FIG. 2 schematically illustrates a multiple-level page table walk which includes both a first stage of translation corresponding to address translation managed by a guest operating system and a second stage of translation corresponding to address translation managed by a hypervisor;

FIG. 3 is a flow diagram schematically illustrating processing occurring upon allocation and victim selection within translation cache or a translation lookaside buffer; and FIG. 4 is a flow diagram schematically illustrating processing occurring upon a look up within a translation lookaside buffer.

EMBODIMENTS

FIG. 1 schematically illustrates a data processing system 2 including a processor core 4 for executing program instructions and for performing data accesses (both instruction fetches and accesses to data to be manipulated) using virtual addresses VA. These virtual addresses are subject to address translation to physical addresses PA by address translation circuitry 6. The physical addresses PA are used to control access to instructions and data within a memory system 8. The memory system 8 may comprise a memory hierarchy, such as multiple levels of cache memory and a main memory or other non-volatile storage.

The address translation circuitry 6 includes eviction control circuitry 10, a unified address translation cache 12, an instruction micro translation lookaside buffer 14 (a further address translation cache), and a data micro translation lookaside buffer 16 (another further address translation cache). The eviction control circuitry 10 is responsible for selecting a victim entry for eviction from the address translation cache 12 from among a plurality of address translation entries stored within the address translation cache 12. Each of the address translation cache entries within the address translation cache 12 has an associated eviction control parameter which is used by the eviction control circuitry 10 to control which of the address translation entries is selected to be a victim entry to be evicted. The eviction control parameters can take a variety of different forms, but may, for example, be a numerical value, such as three-bit value in the range 0 to 7, representing the suitability of the address translation entry for eviction. A low value of this eviction control parameter (e.g. 0) would indicate that such an address translation entry would be least preferred for selection for eviction, whereas a high value of this eviction control parameter (e.g. 7) would indicate a high suitability for selection for eviction.

The instruction micro translation lookaside buffer 14 and the data micro translation lookaside buffer 16 also serve to cache address translation entries and are subject to eviction control by the eviction control circuitry 10. These further address translation caches 14, 16 May have their own separate eviction control algorithms/parameters to control victim selection.

The address translation entries stored within the address translation cache 12 have a plurality of different entry types representing translation data specified at respective different levels of address translation within a multiple-level page table walk. FIG. 2 schematically illustrates such a multiple-level page table walk. In a 2-stage translation process, the virtual address 18 is combined with the address in the (guest) base register 20 to generate an intermediate physical address IPA which is translated by the hypervisor to generate the physical address of the first level page descriptor (steps from 22-24). The output of 24 is the physical address of the guest level 0 (SIL0) page table. This page is indexed using bits of the VA and the descriptor returned contains an IPA which is translated again by the hypervisor, which produces a physical address of the guest's level 1 (S1L1) page table. This process continues until the physical address for S1L3 is accessed, which returns the final IPA. This IPA is translated (by the hypervisor) to produce the physical address for the data to be accessed labeled Final PA in the figure. Thus, the multiple-level page table walk illustrated in FIG. 2 may at its full extent involve 24 stages of translation until the final physical address PA is generated having been subject to translation both by the translations managed by the guest operating system and the translations managed by the hypervisor. This type of two stage multiple-level page table walk is used in the Version 8 processor architecture of the processors designed by ARM Limited of Cambridge, England.

Whilst this full multiple-level page table walk as illustrated in FIG. 2 allows considerable flexibility, it is a process which, even when performed directly in hardware, takes a relatively long time to complete. Accordingly, the address translation cache 12 serves to store address translation entries corresponding to partial translations generated during previous page-table walks. There is a statistically high likelihood that these partial translations will be reused and accordingly if a hit occurs within the address translation cache 12 for a partial translation, then time may be saved and a full 24-stage page table walk may be avoided. It is also likely that final level translations may be reused. Such final level translations may directly represent a translation between a virtual address VA generated by the processor core 4 and physical address PA to be applied to the memory system 8 taking into account both the translations applied and managed by the guest operating system and the hypervisor. In the example illustrated in FIG. 1, such final level translations are stored within the instruction micro translation lookaside buffer 14 and the data micro translation lookaside buffer 16 in respect of instruction fetches and data fetches respectively. Such final level address translation entries may also be stored within the address translation cache 12. Furthermore, intermediate level translations corresponding to intermediate translation results part way through the full 24-stage multiple-level page table walk of FIG. 2 are also be stored within the address translation cache 12. Thus, translation cache 12 stores a plurality of address translation entry representing translation data specified at respective different levels of the multiple-level page table walk of FIG. 2.

The intermediate level address translation entries associated with translations for levels managed by the guest operating system are stage 1 walk cache entries. Intermediate level entries associated with translations managed by the hypervisor are stage 2 walk cache entries.

The final size of the region of memory address space corresponding to a final level entry within the address translation cache can vary. The granularity within which the memory address space may be managed can be controlled into different page or block sizes. The regions may, for example, have sizes such as 4K, 16K, 64K all treated as pages. It is also possible that the memory could be managed at a coarser level with blocks up to, for example, 2 M or 2 G in size. These different sizes of final level entries also correspond to different types of address translation entry and can be differently managed, at least in respect of their eviction behaviour by the eviction control circuitry 10 using appropriate eviction control parameters.

The different types of address translation entry including those discussed above can have different eviction control parameter values associated with them by the eviction control circuitry 10 as they are first stored into the address translation cache 12. These eviction control parameter values are assigned their initial values at the time of allocation in address translation dependence upon the entry type (and thus the eviction control parameters are dependent upon the entry type). Having been initialized to a value dependent upon the entry type, the eviction control parameters associated with individual address data entries are then updated as a consequence of the subsequent use of those address translation entries or as a result of a new address translation entry being allocated to the address translation cache 12. There are two types of updates: 1) a hit will promote (change the eviction control parameter value) the entry being hit and other entries will be left unchanged; and 2) allocating a new entry, which initializes the value of the entry being allocated with the other entries being demoted. The address translation cache 12 is a unified address translation cache in that it stores multiple different types of address translation entries. The individual address translation entries include type identifying data which can be used by the address translation circuitry 6 when performing look ups for address translation entries it is using to perform a required translation from a virtual address VA value to a final physical address PA. If there is no corresponding VA to Final PA mapping in the address translation cache, then an intermediate level address translation entry may be found which corresponds to at least a partial translation of a virtual address VA to be translated and that intermediate level address translation entry can then be used such that the final part of the address translation required to generate the physical address may be reached more rapidly using fewer levels of page table walk.

As previously mentioned, the eviction control circuitry 10 serves to initialize the eviction control parameters to values depending upon the type of address translation entry concerned. The eviction control circuitry subsequently updates these eviction control parameters to change their current value to an updated value corresponding to a lower probability of selection as a victim entry when the address translation entry concerned is accessed (used). If an address translation entry is used, then it is more likely that it will be further used in the future and accordingly it will statistically be beneficial if the likelihood of eviction of that address translation entry is reduced. This can be achieved by the eviction control circuitry 10 updating the eviction control parameter. For example, if an eviction control parameter of 0 indicates the lowest likelihood of eviction, then when an address translation entry is accessed within the address translation cache 12, the eviction control circuitry 10 may update whatever its current prediction control parameter value is to a value of 0. Alternatively, for example, each time an address translation cache data entry is accessed, its eviction control parameter may be reduced by a predetermined amount (e.g. 3) until a minimum value of 0 is reached.

The eviction control circuitry 10 also manages the eviction control parameters value of address translation entries which are not accessed. If an address translation entry is present within the address translation cache 12 and is not being accessed, then it's likelihood for eviction should be increased as its presence within the address translation cache 12 is statistically likely not to be worthwhile. This can be achieved, for example, by the eviction control circuitry 10 acting to update all of the eviction control parameters other than those of an address translation entry being allocated as described above. Thus, when an access is made to a given address translation cache entry, it may have its eviction control parameter value reduced to 0 while other address translation entries are updated when an allocation of another entry occurs, such as increased by a value of 1 up to a maximum value of 7.

As previously mentioned, the multiple-level page table walk of FIG. 2 translates an input address (virtual address VA) to an output address (physical address PA) with each level within the multiple-level page table walk corresponding to a translation of a different portion of the input address to a corresponding portion of the output address. Such page table walk behaviour whereby different bit range portion of an address are translated at each level within the page table walk will be familiar to those in this technical field. Final level translations with a page size of less than a threshold value (e.g. page sizes of 4K, 16K, or 64K) are stored within the instruction micro translation lookaside buffer 14 and the data micro translation lookaside buffer 16. Such final level translations may also be stored within the address translation cache 12, but as this is not the only storage available for such final level translations, the eviction control parameters for such final level entries within the address translation cache 12 may be set to a value indicating a relatively high likelihood of eviction, such as an initial value of 6. Such final level entries may correspond to a group of types of address translation entry which are associated with a highest probability of eviction from the address translation cache 12. If such final level translations are actively being used it is likely that they are being stored and retained within one of the instruction micro-translation lookaside buffer 14 or the data micro translation lookaside buffer 16 and accordingly allocating space to such final level entries within the address translation cache 12 is less likely to be beneficial.

A next group of address translation entry types which may be associated together and share an initialization value for the eviction control parameter are large final level entries (e.g. greater in size than 64K) and intermediate stage 1 (guest operating system managed) walk cache entries (e.g. for pages of 2 M and larger). Such large final level descriptors and intermediate stage 1 walk cache entries may have an initialization value for the eviction control parameter of 4. This corresponds to a low level of probability of eviction.

A final group of entry types in the present example embodiment which can have a initialization value of the eviction control parameter set to 5 (corresponding to an intermediate level of probability of eviction) are intermediate stage 2 (hypervisor managed) walk cache entries or intermediate physical address IPA to physical address PA entries. Such entries are less useful to retain within the address translation cache 12 than the large final level descriptors and the intermediate stage 1 walk cache entries, but are more useful to retain within the address translation cache 12 than the small final level address cache entries.

The above described example embodiment includes a multiple stage multiple-level page table walk in which an input virtual address VA is translated to an intermediate physical address IPA which is then translated to the physical address PA. The present techniques have usefulness outside of such example embodiments, such as when using a single stage of translation. More generally, the efficient use of an address translation cache 12 may be achieved by arranging that different types of address translation entries are stored therein, i.e. multiple different type of address translation entry are stored in the cache 12. However, having formed such a unified address translation cache 12, the control of eviction of those address translation entries of various different types may be improved by utilizing eviction control parameters with value dependent (at least initially) upon the entry type. The address translation cache 12 may itself serve as a translation lookaside buffer in addition to the instruction micro translation lookaside buffer 14 and the data micro translation lookaside buffer 16.

In the above example embodiment the values to which the eviction control parameters were initialized by the eviction control circuitry 10 were set out. These initialization values could be fixed by the hardware. In other embodiments the initialization values for the different entry types could be software configurable under program control, either by selecting from among predetermined sets of initialization values or by individually setting the individual initialization values for each different type of address translation entry. In this way, the eviction control applied to the different types of address translation entries may be tailored to the particular hardware environment in which the system operates and/or the particular processing workload of the system.

The use of the address translation cache 12 to store multiple different types of address translation entry and may accordingly serve as a unified address translation cache is not limited to the use of the eviction control parameters and their management as discussed herein. FIG. 3 schematically illustrates processing occurring when a miss occurs within the address translation cache 12 and an ensuing table walk allocates address translation entries to the address translation cache 12. Step 19 waits until a miss occurs. Step 20 determines whether or not there are any invalid entries currently stored within the address translation cache 12. If there are such invalid entries present, then step 22 serves to allocate one of these as the victim entry to be replaced by the new entry stored within the address translation cache 12 subsequent to the miss identified at step 18. If there is no invalid entry, then processing proceeds to step 24 at which the eviction control circuitry 10 selects an entry with the highest present eviction control parameter value stored within the address translation cache 12 to serve as the victim.

At step 26 a determination is made as to whether or not the new address translation cache entry to be stored within the address translation cache 12 subsequent to the page table walk triggered by the miss is a final level entry with a size less than or equal to 64K. If the entry to be stored is such a relatively small final level entry, then step 28 serves to set its initial eviction control parameter to a value of 6, and processing proceeds to step 30. If the determination at step 26 did not identify a small final level entry, then processing proceeds to step 32 where a determination is made as to whether or not the miss within the address translation cache 12 was to a second stage translation entry as part of the operation of a multiple-stage multiple-level page table walk. If the determination at step 32 is that the miss within the address translation cache 12 corresponds to a second stage translation entry, then step 34 serves to set the initial eviction control parameter to a value of 5 such that when the second stage translation entry corresponding to the miss results in the new entry being stored within the address translation cache 12, it will be set to such an intermediate eviction control parameter value.

If the determination at step 32 is that the entry to be allocated does not correspond to the second stage translation entry, then step 36 serves to set the initial control parameter to a value of 4. The processing reaching step 36 indicates that the entry being allocated is either a final level entry with a size greater than 64K or a first stage intermediate level entry. In either of these cases, the initial eviction control parameter value is set to 4 indicating a lowest probability of selection for eviction.

Step 30 serves to perform the required walk through the multiple-level page table walk illustrated in FIG. 2 to reach the translation data required by the miss in the address translation cache 12 which occurred at step 18 and return this value which is then written as a new entry into the address translation cache 12 with an initial control parameter value set in accordance with the steps 28, 34 or 36 as above. Step 38 then serves to update the eviction control parameter values for the other entries within the address translation cache 12 as these have not been accessed by the operations of FIG. 3. In practice multiple allocations (of different entry types) can happen during the walk. Victim selection and eviction control parameter values are determined at allocation of any new entries into the address translation cache 12.

FIG. 4 schematically illustrates look up operations within the address translation cache 12. Processing waits at step 40 until there is a virtual address to translate. Step 42 determines whether or no the virtual address hits within one of the data micro translation lookaside buffer 16 or the instruction micro translation lookaside buffer 14. If there is a hit in either of these, then processing proceeds to step 44 where the output physical address is generated at step 45.

If there is no hit detected at step 42, then processing proceeds to step 46 where a determination is made as to whether or not there is a hit within the address translation cache 12. If there is such a hit, then step 46 serves to update the eviction control parameter value for the entry that hit (e.g. reduced the value to 0 or decrement that value towards 0 by a predetermined amount). The other eviction control parameters which are not subject to the identified hit at step 44 have their eviction control parameter values remain unchanged.

Step 48 determines whether the entry which hit within the address translation cache 12 at step 44 was a final level entry. If the hit was a final level entry, then processing again proceeds to step 44 at which the output physical address is generated. If the hit identified at step 44 was not a final level hit, then processing proceeds to step 50 where a determination is made as to whether the hit identified at step 44 relates to an intermediate physical address. If the hit does correspond to an intermediate physical address, then processing is returned to step 44 where a test may be made to see whether the next level of translation is present as an address translation entry within the address translation cache 12. If the determination at step 50 is that the returned entry is not an intermediate physical address, then processing proceeds to step 52 where the miss actions illustrated in FIG. 3 are performed prior to returning processing to step 48.

Although illustrative embodiments have been described in detail herein with reference to the accompanying drawings, it is to be understood that the claims are not limited to those precise embodiments, and that various changes, additions and modifications can be effected therein by one skilled in the art without departing from the scope and spirit of the appended claims. For example, various combinations of the features of the dependent claims could be made with the features of the independent claims.

We claim:
1. Apparatus for processing data comprising:
an address translation cache to store a plurality of address translation entries; and
eviction control circuitry to select a victim entry for eviction from said address translation cache from among said plurality of address translation entries; wherein
said plurality of address translation entries are selected from among a plurality of different entry types of address translation entries representing translation data specified at respective different levels of address translation within a multiple-level page table walk;
selection of said victim entry by said eviction control circuitry is dependent upon respective eviction control parameters associated with said plurality of address translation entries; and
a given eviction control parameter for a given address translation entry is dependent upon an entry type of said given address translation entry among said plurality of different entry types of address translation entry.
2. Apparatus as claimed in claim 1, wherein, when said given address translation entry is stored into said address translation cache, said given eviction control parameter is initialized by said eviction control circuitry to an initialization value dependent upon said entry type of said given address translation entry.
3. Apparatus as claimed in claim 1, wherein, when said given address translation entry is accessed within said address translation cache, a current value of said given eviction control parameter is changed by said eviction control circuitry to an updated value corresponding to a lower probability of selection of said given address translation entry as said victim entry.
4. Apparatus as claimed in claim 1, wherein, when an address translation entry other than said given address translation entry is evicted from said address translation cache, a current value of said given eviction control parameter is changed by said eviction control circuitry to an updated value corresponding to a higher probability of selection of said given address translation entry as said victim entry.
5. Apparatus as claimed in claim 1, wherein said multiple-level page table walk translates an input address to an output address with each level within said multiple-level page table walk corresponding to translation of a different portion of said input address to a corresponding portion of said output address.

6. Apparatus as claimed in claim 5, wherein plurality of different entry types correspond to respective different levels within said multiple-level page table walk.

7. Apparatus as claimed in claim 6, wherein at least one of said plurality of different entry types is a type corresponding to a final level of translation of said input address to said output address.

8. Apparatus as claimed in claim 7, comprising a further address translation cache to store address translation entries corresponding to said final level of translation of said input address to said output address.

9. Apparatus as claimed in claim 8, wherein address translation entries corresponding to said final level of translation for regions of memory address space of less than a threshold size have an initially allocated associated eviction control parameter corresponding to a highest probability of eviction from said address translation cache.

10. Apparatus as claimed in claim 9, wherein at least one of said plurality of different entry types is a intermediate type corresponding to an intermediate level of translation of said input address to said output address and address translation entries corresponding to said intermediate type have an initially allocated associated eviction control parameter corresponding to a lower probability of eviction than for said address translation entries corresponding said final level of translation and to output addresses within regions of memory address space of less than said threshold size.

11. Apparatus as claimed in claim 5, wherein said multiple-level page table walk provides a first stage of translation of a virtual address as said input address to an intermediate physical address and a second stage of translation of said intermediate physical address to a physical address as said output address.

12. Apparatus as claimed in claim 11, wherein said first stage of translation corresponds to address translation managed by a guest operating system executed using a virtual machine execution environment managed by a hypervisor and said second stage of translation corresponds to address translation managed by said hypervisor.

13. Apparatus as claimed in claim 12, wherein address translation entries corresponding to intermediate translations of said first stage of translation have an initially allocated associated eviction control parameter corresponding to a lowest probability of eviction from said address translation cache.

14. Apparatus as claimed in claim 1, wherein said plurality of different entry types are divided into a plurality of groups, each of said plurality of groups having an associated eviction control parameter.

15. Apparatus as claimed in claim 1, wherein said address translation cache is a translation lookaside buffer.

16. Apparatus as claimed in claim 1, wherein said eviction control parameters are user configurable parameters under software control.

17. Apparatus for processing data comprising:

means for storing a plurality of address translation entries; and means for selecting a victim entry for eviction from said means for storing from among said plurality of address translation entries;

wherein:

said plurality of address translation entries are selected from among a plurality of different entry types of address translation entries representing translation data specified at respective different levels of address translation within a multiple-level page table walk;

selection of said victim entry by said means for selecting is dependent upon respective eviction control parameters associated with said plurality of address translation entries; and a given eviction control parameter for a given address translation entry is dependent upon an entry type of said given address translation entry among said plurality of different entry types of address translation entries.

18. A method of processing data comprising:

storing a plurality of address translation entries within an address translation cache; and selecting a victim entry for eviction from said address translation cache from among said plurality of address translation entries; wherein said plurality of address translation entries are selected from among a plurality of different entry types of address translation entries representing translation data specified at respective different levels of address translation within a multiple-level page table walk;

selection of said victim entry is dependent upon respective eviction control parameters associated with said plurality of address translation entries; and a given eviction control parameter for a given address translation entry at least initially is dependent upon an entry type of said given address translation entry among said plurality of different entry types of address translation entry.

* * * * *